United States Patent [19]

Singleton et al.

[11] Patent Number: 5,066,111

[45] Date of Patent: Nov. 19, 1991

[54] ELECTROCHROMIC WINDOW WITH INTEGRATED BUS BARS

[75] Inventors: David E. Singleton, Natrona Heights; Kuo-Chuan Ho, Pittsburgh; Charles B. Greenberg, Murrysville, all of Pa.

[73] Assignee: PPG Industries, Inc., Pittsburgh, Pa.

[21] Appl. No.: 406,477

[22] Filed: Sep. 13, 1989

[51] Int. Cl.$^5$ .............................................. G02F 1/01
[52] U.S. Cl. ..................................... 359/275; 359/245
[58] Field of Search ...................... 350/353, 355, 357; 429/209; 252/500

[56] References Cited

U.S. PATENT DOCUMENTS

| | | |
|---|---|---|
| 3,521,941 | 7/1970 | S.K.Deb, et al. . |
| 4,088,392 | 5/1978 | Meyers . |
| 4,088,395 | 5/1978 | Giglia . |
| 4,116,545 | 9/1978 | Reddy . |
| 4,174,152 | 11/1979 | Giglia, et al. . |
| 4,294,867 | 10/1981 | Boaz ............................... 427/96 |
| 4,304,465 | 12/1981 | Diaz ............................... 350/357 |
| 4,323,946 | 4/1982 | Truax . |
| 4,335,938 | 6/1982 | Giglia, et al. . |
| 4,361,385 | 11/1982 | Huang, et al. . |
| 4,375,318 | 3/1983 | Giglia, et al. . |
| 4,388,522 | 6/1983 | Boaz . |
| 4,478,991 | 10/1984 | Huang, et al. . |
| 4,645,308 | 2/1987 | Tracy, et al. . |
| 4,772,760 | 9/1988 | Graham . |
| 4,768,865 | 9/1988 | Greenberg, et al. . |
| 4,874,229 | 10/1989 | Ito et al. ............................... 350/357 |
| 4,902,110 | 2/1990 | Green ............................... 350/357 |
| 4,957,352 | 9/1990 | Yasuda et al. ....................... 350/353 |

Primary Examiner—Rolf Hille
Assistant Examiner—Mahshid Saadat
Attorney, Agent, or Firm—Gay A. Spahn; Andrew C. Siminerio; Donald C. Lepiane

[57] ABSTRACT

An electrochromic window includes a first transparent substrate, an electroconductive film electrode, a transparent electrochromic film in contact with said electroconductive film, an ion-conductive layer in contact with said electrochromic film, a counter electrode in contact with said ion-conductive layer, and a second transparent substrate overlaying the counter electrode. A plurality of bus bars extend across the electroconductive film electrode to distribute electrical current throughout the film electrode and provide a more uniform current density between the film electrode and the counter electrode.

19 Claims, 1 Drawing Sheet

ELECTROCHROMIC WINDOW WITH INTEGRATED BUS BARS

BACKGROUND OF THE INVENTION

1. Field of the Invention

This invention relates to electrochromic cells, and more particularly to accelerating the change in the electrochromic window from a high transmittance to lower transmittance state and making the change between transmittance states more uniform.

2A. Technical Considerations

Electrochromic devices have been proposed for use in alpha-numeric display panels in items such as digital watches, calculators and the like and in transparent windows. Electrochromic cells typically comprise a thin film of persistent electrochromic material, i.e. a material responsive to the application of an electric field or potential of a given polarity to change from a high transmittance, low-absorbing state to a lower transmittance, absorbing or reflecting state and remaining in the lower transmittance state after the electric field is discontinued, preferably until an electric field of reversed polarity is applied to return the material to the high transmittance state. The electrochromic film is in ion-conductive contact, preferably in direct physical contact, with a layer of ion-conductive material. The ion-conductive material may be solid, liquid or gel but is preferably a solid polymer layer. The electrochromic film and ion-conductive layers are disposed between two electrodes.

As voltage is applied across the two electrodes, ions are transported through the ion conducting layer. When the electrode directly adjacent to the electrochromic film is the cathode, application of a DC current causes darkening of the film, referred to as coloration. Reversing the polarity causes reversal of the electrochromic properties and the film reverts to its high transmittance state, referred to as bleaching.

2B. Patents of Interest

The following list of patents disclose various electrochromic transparency arrangements:

| U.S. Pat. No. | Inventor |
| --- | --- |
| 3,521,941 | Deb et al. |
| 4,088,392 | Meyers |
| 4,088,395 | Giglia |
| 4,116,545 | Reddy |
| 4,174,152 | Giglia et al. |
| 4,335,938 | Giglia et al. |
| 4,361,385 | Huang et al. |
| 4,375,318 | Giglia et al. |
| 4,478,991 | Huang et al. |
| 4,645,308 | Tracy et al. |
| 4,768,865 | Greenberg et al. |

U.S. Pat. Nos. 4,294,867 and 4,388,522 to Boaz disclose heated transparencies with electroconductive ceramic heating elements.

U.S. Pat. No. 4,323,946 to Truax discloses an electrostatic charge reduction arrangement. Point source collectors extend through a dielectric material and are interconnected by an electrically conductive grid system that is connected to a ground.

SUMMARY OF THE INVENTION

The present invention provides an electrochromic transparency that uniformly changes between transmittance states by providing a more uniform current density between the electrodes of the transparency. In one particular embodiment, the invention is practiced to improve a laminated transparency of the type having a transparent substrate, an electroconductive film electrode member, a transparent electrochromic film in contact with the electroconductive electrode member, an ion-conductive layer in contact with the electrochromic film, a counter electrode in contact with the ion-conductive layer, and a second transparent substrate overlaying the counter electrode. Electric current passing through the film electrode encounters lateral electrical resistance that results in a non-uniform current density between the film electrode and the counter electrode, which in turn causes a gradient in the transparency as it switches from one transmittance state to the other. The improvement of the present invention provides a more uniform change between transmittance states by positioning an electroconductive grid arrangement in electrical contact with the film electrode to distribute electrical charge to the film electrode. This distribution of electrical charge provides a more uniform current density between the film electrode and the counter electrode, resulting in a more uniform change in the transmittance level of the transparency.

DETAILED DESCRIPTION OF THE PRESENT INVENTION

The present invention is disclosed in combination with a transparent glass laminate, but it should be understood that it may be used in any type of electrochromic display which requires acceleration and uniformity of the coloration and bleaching operations.

Figure 1:
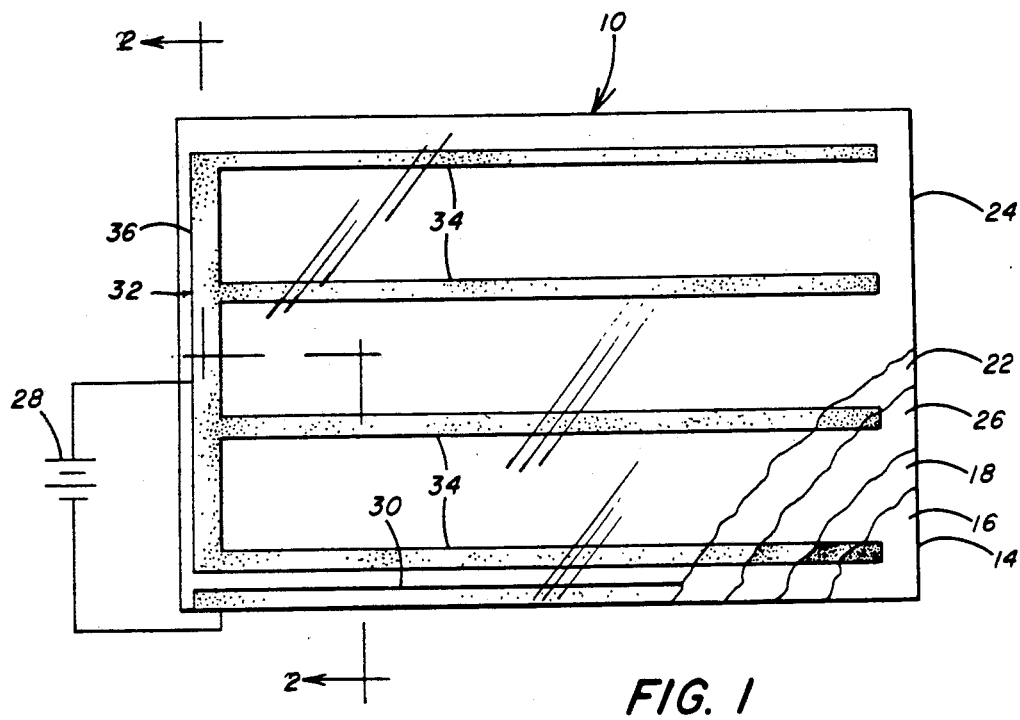
FIG. 1 is a plan view of an electrochromic transparency incorporating the novel features of the present invention.
Figure 2:
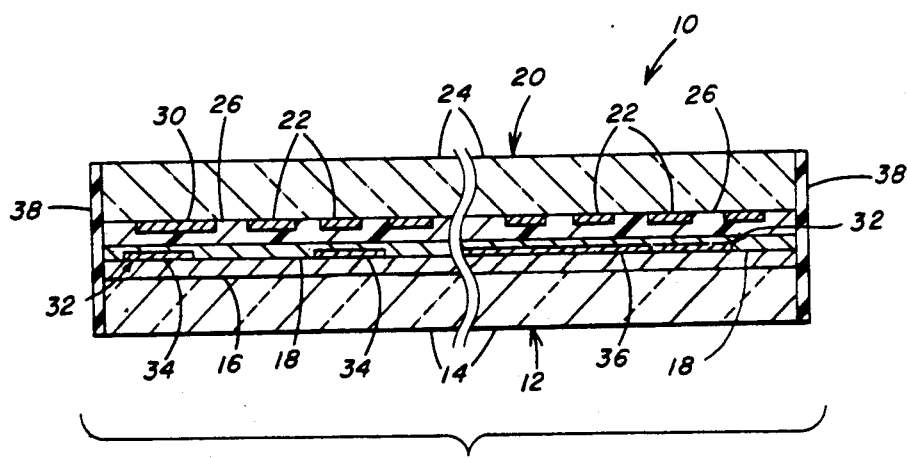
FIG. 2 is a view through line 2—2 in FIG. 1.

Referring to FIGS. 1 and 2, in a preferred embodiment of the present invention, an electrochromic cell similar to that disclosed in U.S. Pat. No. 4,768,865 to Greenberg et al., which teachings are herein incorporated by reference, is incorporated into a transparent laminate 10. One electrode 12 of the electrochromic cell comprises a glass substrate 14 coated with an electroconductive film 16, preferably tin oxide, having a sheet resistance of about 25 ohms per square or less. An electrochromic film 18, preferably tungsten oxide, is deposited over the conductive film 16, preferably by evaporation or sputtering, to a preferred thickness of about 1000 to 4000 Angstroms. Although not limiting in the present invention, in the particular embodiment illustrated in FIGS. 1 and 2, the counter electrode 20 of the cell is a metal grid 22 disposed adjacent to a second, uncoated glass substrate 24. A preferred metal for the grid is copper. The metal grid pattern may be square or rectangular but for optimum optical properties, is preferably in a pattern of interconnected circles as disclosed in U.S. patent application Ser. No. 43,919, filed Apr. 28, 1987, the disclosure of which is incorporated herein by reference. Disposed between the electrochromic film 18 and metal grid 22 is an ion-conductive material 26, preferably an ion-conductive polymer as known in the art. Preferred ion-conductive polymers include 2-acrylamido-2-methylpropanesulfonic acid homopolymers (AAMPS) and AAMPS polymers with vinyl sulfonic acid. Preferably, the metal grid counter electrode 22 is embedded in the ion-conductive polymer 26 at the interface of polymer and the uncoated glass substrate 24. Electrical current from a power source 28 (shown only in FIG. 1) is provided to the metal grid 22 by a bus bar 30 along an edge of the laminate 10.

The metal grid 22 has a low electrical resistance that rapidly provides a uniform electrical charge distribution throughout the counter electrode 20. However, current passing through the thin electroconductive film 16 encounters lateral electrical resistance which decreases the speed and uniformity of the charge distribution throughout the film 16 and adjacent electrochromic film 18. As a result, the current density between the films 16 and 18 and the grid 22 is non-uniform and during the bleaching and coloration operations, there is a gradient in the transmittance of the laminate 10 in the direction of the current flow through the film 16. In other words, when the laminate 10 is transparent, i.e. the electrochromic film 18 is in a high transmissive state, and is energized such that the film 16 is the cathode, the portions of the electrochromic film 18 closest to the power source connection to the film 16 begin to darken while the portions of electrochromic film 18 furthest from the power source connection to film 16 initially remains transparent. Conversely, when the laminate 10 is dark, i.e. the electrochromic film 18 is in a low transmissive state, and energized with film 16 as the anode, the bleaching of the electrochromic film 18 initially occurs in the vicinity of the power source connection to the film 16 while remaining portions of the electrochromic film 18 initially remain colored. The operation eventually reaches equilibrium so that the electrochromic film 18 is uniformly colored or bleached and the laminate 10 has a uniform transmissivity.

In order to speed the coloration/bleaching operations and make them more uniform over the entire surface of the laminate 10, the present invention utilizes multiple power source connections to the film 16 which more uniformly distribute current throughout the film 16 by reducing the current path through the film 16, i.e. the distance the current must travel through the film 16 to establish the required current density between the film 16 and the grid 22 for the coloration/bleaching operations. Although not limiting in the present invention, in the particular embodiment illustrated in FIGS. 1 and 2 the laminate 10 includes a power distribution arrangement 32 having longitudinally extending bus bars 34 connected to a common terminal bus bar 36. The power source 28 is connected to the terminal 36 and current flows through the bus bars 34 to the film 16 to reduce the current path and more evenly distribute the charge throughout the film 16. The particular pattern shown in FIGS. 1 and 2 is rectangular but it is obvious that other patterns may be used, for example, circular, diamond shaped, or a corporate logos. The bus bars 34 and terminal 36 may be any electroconductive material and preferably a metal foil that is secured to the surface of the glass sheet 14 or an electroconductive ceramic frit that can be fired onto the glass surface prior to or after coating the glass with the film 16. Care must be taken to insure that the bus bars and terminal do not react with the other components of the laminate. In particular, it has been found that AAMPS ion-conductive material 26 may attack the silver in a silver containing ceramic bus bar arrangement 32 through the electrochromic film 18 and degrade the bus bars 34 and terminal 36. This condition can be remedied by insulating the bus bars and terminal from the ion-conductive material 26, for example with an overcoat (not shown), such as but not limited to silica oxide. Referring to the embodiment of the invention shown in FIGS. 1 and 2, the overcoat is applied only over the bus bar arrangement so that the bus bars 34 are still in electrical contact with the electroconductive film 16 but will not react with the ion-conductive material 26 through the electrochromic film 18 and overcoat.

The present invention will be further understood from the description of the specific example which follows.

A transparent electrochromic laminate is prepared using two glass members which are heated and shaped by gravity sag bending in a manner well known in the art. Glass substrate 24 is three millimeters thick, heat absorbing, uncoated, float glass available from PPG Industries under the tradename Solargray ®. Glass substrate 14 is three millimeters thick clear float glass coated with a tin oxide film 16 having a sheet resistance of about 15 to 30 ohms per square. The electroconductive bus bar arrangement 32 includes 1/16 inch (0.16 centimeters) wide conductive adhesive backed copper strips 34 secured to the coated glass 16 and spaced approximately 3½ inches (9 centimeters) apart. An electrochromic film 18 of tungsten oxide $WO_3 \cdot yH_2O$, wherein y represents the extent of hydration, is deposited over tin oxide film 16 and bus bar arrangement 32 by magnetic sputtering. The electrochromic tungsten oxide film 18 is deposited to a uniform thickness of about 1600 Angstroms. A 0.031 inch (about 0.79 millimeters) thick sheet of ion-conductive material 26 made from AMPS ® monomer, available from Lubrizol Corp., Ohio, is placed over the tungsten oxide film 18. An electroformed copper grid 22 having a circular pattern with 0.0025 inch (about 0.0635 mm) wide lines at 20 lines per inch (about 8 lines per centimeter) spacing is placed over the ion-conductive layer 26 and is overlayed by the second glass sheet 24 which includes a strip of copper tape along one edge to act as a terminal bus bar 30 for the metal grid 22. The entire assembly is then laminated to form a unitary structure and the edge of the laminate 10 is sealed, preferably with a butyl material seal 38 (shown only in FIG. 2), to maintain the moisture content within the laminate.

The electrochromic laminate 10 thus formed has a luminous transmittance of about 50% at a wavelength of 550 nanometers. When an electric current is applied across the cell at a superficial current density of about 0.32 milliampere per square inch (about 0.05 milliampere per square centimeter) the electrochromic laminate darkens to 15% transmittance in about two minutes. When the polarity is reversed, the electrochromic film returns to its initial transmittance in about two minutes.

The above example is offered only to illustrate a preferred embodiment of the invention. Other materials, such as those taught in U.S. Pat. No. 4,768,865, may be used.

The forms of the invention shown and described in this disclosure represent illustrative preferred embodiments thereof. It is understood that the invention is defined in the claimed subject matter which follows and that various modifications thereof which become obvious in light of reading the description are incorporated therein.

We claim:

1. In a laminated article having variable transmittance in response to electric potential wherein the article includes:

electrode means comprising an electroconductive film on a surface of a transparent substrate and an electrochromic film in contact with the electroconductive film;

counter electrode means comprising an ion-conductive layer in contact with current conducting means; and the ion-conductive layer of the counter electrode means in contact with the electrochromic film of the electrode means, the improvement comprising:

the electrode means comprising:

at least one current conducting member in electrical contact with surface portions of the electroconductive film; and means providing electrical connection to said at least one current conducting member.

2. The article as in claim 1 wherein said transparent substrate is glass.

3. The article as in claim 1 wherein said at least one current conducting member includes means to flow current through said electroconductive film at a rate slower than current flowing through said at least one current conducting member.

4. The article as in claim 3 wherein said current conducting means of said counter electrode means includes a metal grid.

5. The article as in claim 3 wherein said means to flow current includes said at least one conducting member having a plurality of electroconductive strip members in electrical contact with said electroconductive film, said strip members having a resistance less than the resistance of said electroconductive film, such that current flows through said strip members to said electroconductive film.

6. The article as in claim 5 further including an electroconductive terminal member interconnecting said strip members.

7. The article as in claim 3 wherein said at least one current conducting member is mounted on a major surface of the substrate.

8. The article as in claim 6 where said strip members are strips of metallic tape.

9. The article as in claim 8 wherein said strips of metallic tape are strips of copper tape.

10. The article as in claim 5 wherein said strip members are strips of an electroconductive ceramic enamel.

11. The article as in claim 5 wherein said electrochromic film comprises tungsten oxide at a thickness of 1000 to 4000 Angstroms.

12. The article as in claim 5 wherein said ion-conductive layer comprises a polymer.

13. The article as in claim 12 wherein said counter electrode means comprises a metal grid embedded in said polymer layer.

14. The article as in claim 5 wherein said current conducting means of said counter electrode means includes a transparent substrate defined as a second transparent substrate adjacent to a metal grid.

15. The article as in claim 14 wherein said first and second transparent substrates are glass.

16. The article as in claim 15 wherein said metal grid is adjacent to said second transparent substrate.

17. The article as in claim 3 wherein said current conducting member is between the electroconductive film and the electrochromic film.

18. In a method of making a laminated article having variable transmittance in response to electric potential wherein the method includes the steps of:

providing an electrochromic film in contact with an electroconductive film to define a conductive laminate;

mounting the conductive laminate on a surface of a transparent substrate to define an electrode means;

providing an ion-conductive layer in contact with current conducting means to define a counter electrode means; and contacting the ion-conductive layer of the counter electrode means and the electrochromic film of the electrode means;

the improved method comprising the steps of:

providing at least one current conducting member in electrical contact with the electroconductive film; and providing electrical access to the at least one current conducting member.

19. The method set forth in claim 18 wherein said step of providing at least one current conducting member includes the step of providing the at least one current conducting member between the electroconductive film and the electrochromic film.

* * * * *